United States Patent [19]
Willinger

[11] Patent Number: 4,602,996
[45] Date of Patent: Jul. 29, 1986

[54] AQUARIUM FILTER ASSEMBLY

[75] Inventor: Allan H. Willinger, Franklin Lakes, N.J.

[73] Assignee: Willinger Bros., Inc., Oakland, N.J.

[21] Appl. No.: 723,774

[22] Filed: Apr. 16, 1985

Related U.S. Application Data

[63] Continuation-in-part of Ser. No. 456,424, Jan. 7, 1983, Pat. No. 4,512,885.

[51] Int. Cl.⁴ ............................................. E04H 3/20
[52] U.S. Cl. ................................... 210/136; 210/169; 210/416.2
[58] Field of Search ..................... 119/5; 210/117, 136, 210/169, 255, 416.2

[56] References Cited

U.S. PATENT DOCUMENTS

| | | | |
|---|---|---|---|
| 1,990,214 | 2/1935 | Zapffe | 210/255 |
| 3,512,646 | 5/1970 | Willinger | 210/169 |
| 3,549,015 | 12/1970 | Willinger | 210/416.2 |
| 3,853,429 | 12/1974 | Wiedenmann | 417/424 |
| 3,892,663 | 7/1975 | Wiedenmann | 210/416.2 |
| 4,039,453 | 8/1977 | Horvath | 210/169 |
| 4,186,093 | 1/1980 | Willinger | 210/169 |
| 4,285,813 | 8/1981 | Stewart et al. | 210/169 |
| 4,354,931 | 9/1982 | Allori et al. | 210/136 |
| 4,490,250 | 12/1984 | Dockery | 210/169 |
| 4,512,885 | 4/1985 | Willinger | 210/169 |

Primary Examiner—Peter Hruskoci
Attorney, Agent, or Firm—Pennie & Edmonds

[57] ABSTRACT

An aquarium filter having a housing unit which is adapted to be mounted onto a wall of an aquarium tank. The housing includes an inlet chamber for receiving contaminated water from the aquarium tank and a filter chamber for filtering the contaminated water from the inlet chamber. A motor unit is supported by the housing and includes stator laminations which can be energized by means of a coil. A removable unitary intake assembly is positioned in the housing. The intake assembly includes an intake tube for supplying the contaminated water from the aquarium tank to the inlet chamber. It also includes a rotor assembly having an impeller mounted on it. The rotor assembly extends into the intake storage chamber and is magnetically coupled to the stator laminations to thereby drive the impeller pump.

10 Claims, 9 Drawing Figures

AQUARIUM FILTER ASSEMBLY

RELATED APPLICATION

This is a continuation-in-part of U.S. application Ser. No. 456,424, filed Jan. 7, 1983 now U.S. Pat. No. 4,512,885.

BACKGROUND OF THE INVENTION

This invention relates to aquarium filters, and more particularly to an external aquarium filter utilizing a magnetically coupled pump impeller and having an easily removable, unitary intake assembly.

Aquarium filters are regularly utilized for the purpose of aeration and filtration of the aquarium water and at the same time provide circulation to such water. One type of aquarium filter is an externally mounted filter which houses filtration equipment and includes a pumping mechanism which induces the circulation of water from the aquarium through the filtration equipment and then returns the clean water to the aquarium.

In order to provide circulation of the water, a suitably adapted pumping mechanism must be provided within the water flow path. In some filters, a motor driving a pump is hermetically enclosed and positioned directly within the flow path. However, such pumping mechanisms are costly and difficult to repair.

In other prior art devices the motor is maintained in a separate location from the flow path and is magnetically coupled to an impeller which is positioned in the flow path. One such prior art device is described in U.S. Pat. No. 3,512,646. Another magnetically coupled aquarium filter is described in U.S. Pat. No. 4,093,547. In both these devices, the entire motor, including the stator and rotor are mounted externally of the flow path and a separate impeller is magnetically coupled to the rotor. However, it is difficult to gain access and clean the impeller.

One type of motor pump assembly which permits completely submerged operation of the motor is described in U.S. Pat. No. 3,853,429. In this type, again it is difficult to gain access to the parts of the motor assembly in order to provide cleaning and repair.

In the externally mounted aquarium filters, an intake mechanism must be provided in order to supply the contaminated aquarium water to the filter. This intake mechanism and impeller has a tendency of getting clogged by bits of aquatic vegetation and other detritus that accumulates in an aquarium. It is therefore of importance to be able to easily remove the intake assembly and impeller assembly in order to clean it. In most cases, since the intake assembly is associated with the impeller, the problem of cleaning the intake assembly is compounded by the necessity to also remove the impeller which is virtually inaccessible without emptying and inverting the filter.

Maintenance of filtration devices requires replacement of the filtering material and also requires regular cleaning of the intake assembly and especially the impeller unit. With prior art filtration devices the intake assembly is often an integral part of the entire device and it is therefore necessary to remove and clean out the entire device in order to remove any of the contamination particles clogging the flow path. In addition, in order to gain access to the impeller, it was necessary to substantially disassemble the entire device. Accordingly, cleaning, repairing and maintenance of prior art filtration devices presented considerable problems.

SUMMARY OF THE INVENTION

It is accordingly an object of the present invention to provide an aquarium filter assembly which avoids the aforementioned problems of prior art devices.

Still another object of the present invention is to provide an aquarium filter having a unitary intake assembly including an inlet flow mechanism integrally supporting an impeller mechanism, and wherein the unitary intake assembly is easily removable for cleaning and repair purposes.

Yet a further object of the present invention is to provide an aquarium filter assembly having a motor stator externally mounted of the filter housing and having a magnetically coupled rotor impeller contained within a unitary intake assembly supported by the filter housing.

Still a further object of the present invention is to provide an aquarium filter assembly having a pump rotor assembly mounted internally of the water flow chamber as part of a unitary intake assembly, and magnetically coupled to an externally mounted stator assembly.

A further object of the present invention is to provide an aquarium filter assembly having an impeller mounted on a rotor assembly as part of a unitary intake assembly, and having the rotor assembly magnetically coupled to an externally mounted stator assembly.

A further object of the present invention is to provide an aquarium filter assembly having an intake receiving chamber in flow communication with a filter chamber which, in turn, is separated by filtering devices from a clean water chamber, and including a removable unitary intake assembly associated with the receiving chamber, and a spillway associated with the clean water chamber.

Briefly, in accordance with the present invention, there is provided an aquarium filter assembly having a housing unit which is adapted to be mounted externally on a wall of an aquarium tank. The housing unit contains an inlet chamber for receiving contaminated water from the aquarium tank, and a filter chamber for filtering the contaminated water passing from the inlet chamber. The two chambers are in fluid flow communication with each other. A motor unit is provided which is supported by the housing unit. A removable unitary intake assembly is supportedly positioned in the housing and includes inlet flow tubes for supplying the contaminated water from the aquarium tank to the inlet chamber, and a pump impeller unit which is magnetically coupled to the motor unit.

In an embodiment of the invention, the externally supported motor unit includes stator laminations which define a bore therein. A tube depends from the inlet chamber and fits into the bore. The pump impeller unit is mounted on a rotor and extends from the inlet flow tubes into the depending tube to be magnetically coupled to the stator laminations.

These and other objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DESCRIPTION OF THE PREFERRED EMBODIMENT

Figures 6, 7:
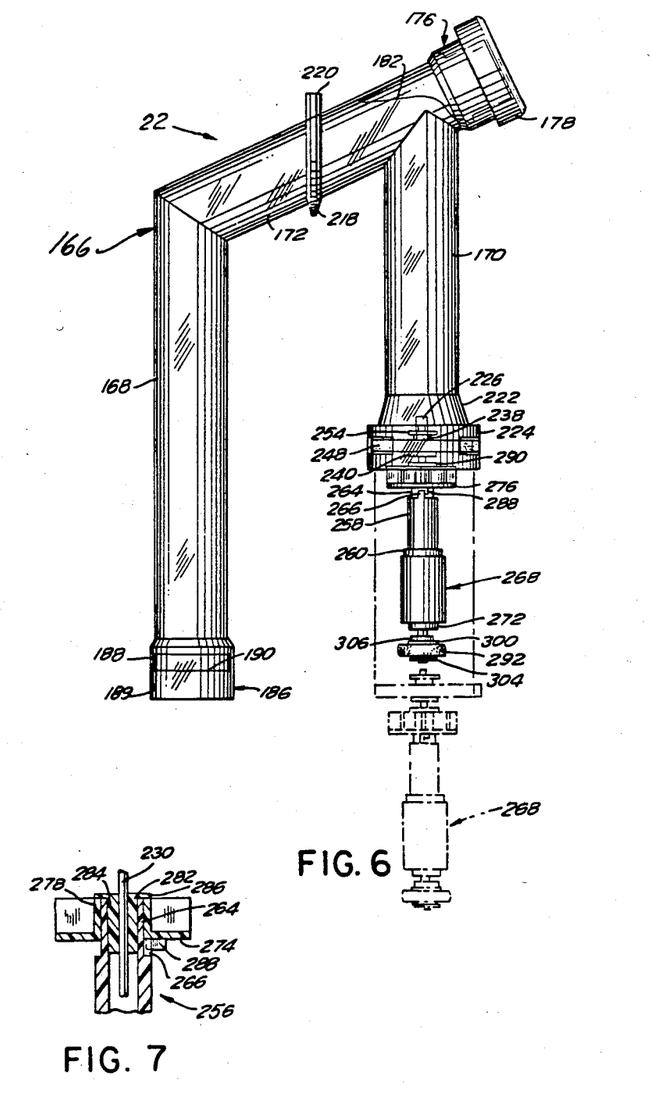
FIG. 6 is an elevational view of the intake assembly specifically showing it as a unitary removable unit.
FIG. 7 is a cross sectional view of the clutch mechanism between the impeller and the rotor sleeve.

Referring now to the drawings, there is shown an aquarium filter apparatus which is designated generally by the number 10 and comprises a tank 12 in which is placed a sheet of filter material 14. A cover member 16 is disposed over the tank 12. A motor housing 18 is retained beneath the tank 12 by means of the U-shaped bale 20. A unitary intake assembly, as shown in FIG. 6 and designated generally by 22 is positioned in the tank 12.

More particularly, the tank 12, which is typically formed of transparent plastic material, includes a substantially rectangular configuration having a rear wall 24, opposing side walls 26, 28, and a front wall 30. Intermediary double walls 31, 32 extend from the front wall 30 partially towards the rear wall 24. The tops of the intermediary walls 31, 32 terminate at a point lower than the upper edge 34 of the rear wall 24. The intermediary walls 31, 32 separate the tank into an intake receiving chamber 36 on one side of wall 32 and a filtering chamber 38 on the other side of wall 31. A downwardly sloped wall 40 is spaced between the lower part of the intermediary walls 31, 32 and the rear wall 24, and extends only the partial height of the rear wall 24. The sloped wall 40 also terminates at a point below the upper edge of the front wall 30. This permits the fluid in the intake chamber 36 which is at a level above the water 40 to flow over the wall 40 and into the filtering chamber 38.

The physical separation of the inlet and filter chambers also permits priming of the pump with just a small amount of water. It is not necessary to fill the entire filter housing as is common with other filters of this type but just the inlet chamber to a level submerging the impeller portion of the pump, as will be more apparent from below.

Figure 1:
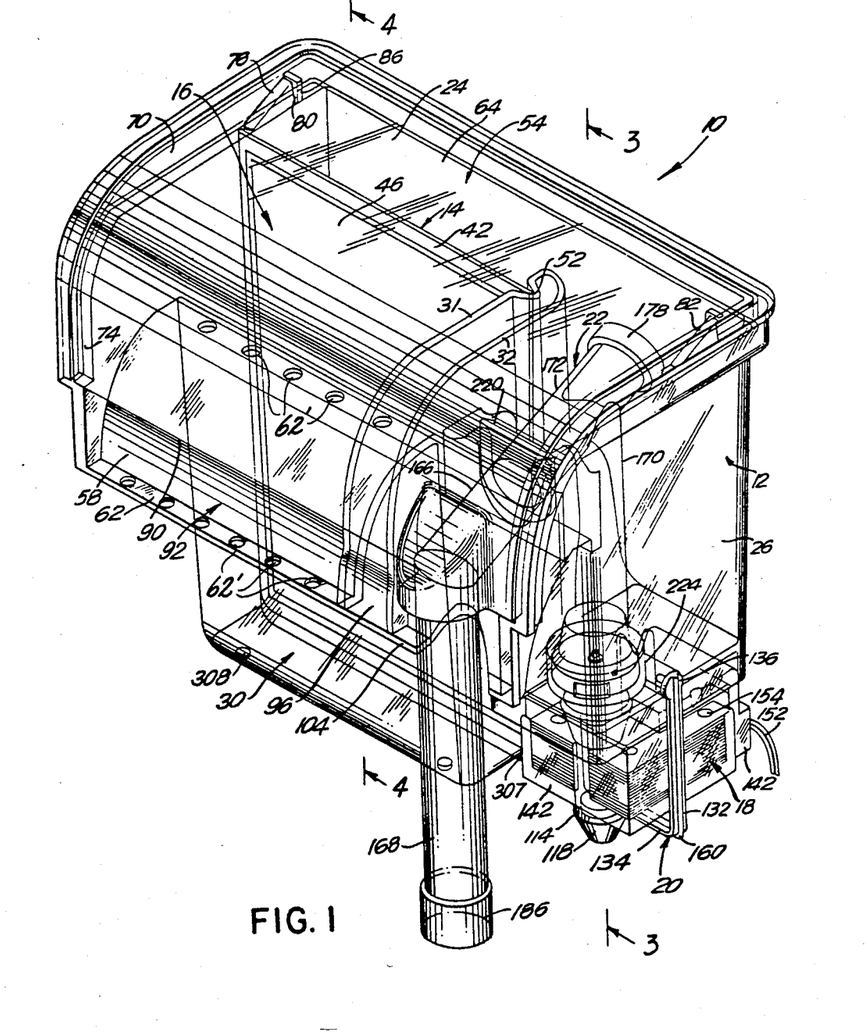
FIG. 1 is a perspective view of the aquarium filter assembly in accordance with the present invention.
Figure 2:
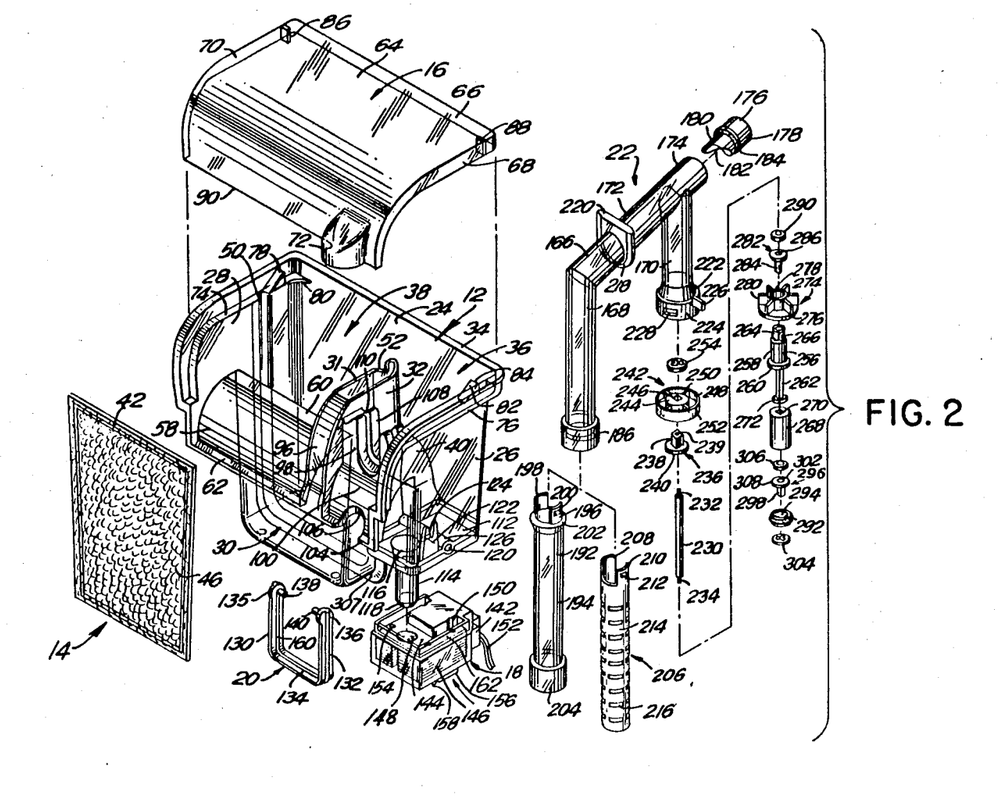
FIG. 2 is an exploded perspective view of the aquarium filter assembly shown in FIG. 1.
Figure 4:
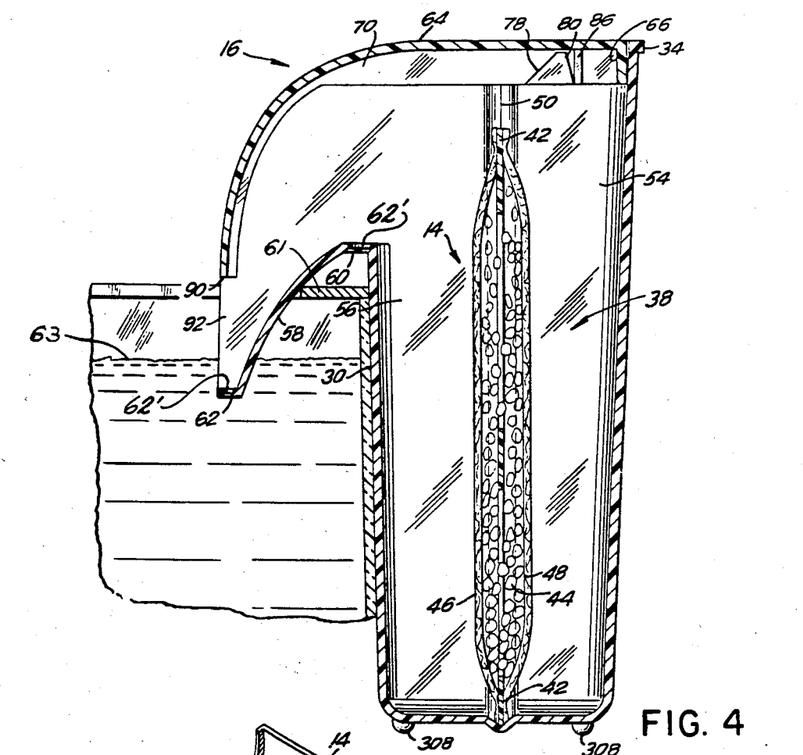
FIG. 4 is a cross sectional elevational view taken along line 4—4 of FIG. 1 and specifically showing the filter chamber in communication with the clean water chamber and the spillway.

The filtering chamber 38, is also divided by means of the filter 14 inserted in the filtering chamber. Specifically, as best seen in FIGS. 1, 2 and 4, a filter 14 is formed of a frame 42 supporting filter material 44 contained between a front and rear wall 46, 48. The frame 42 is maintained in place by means of a vertical groove 50 located along side wall 28 and a corresponding vertical groove 52 located in the intermediary wall 31. These grooves permit sliding down of the frame 42 into the filtering chamber 38 where it is maintained in place.

The compartment formed between the rear wall 24 and the filter 14 is hereinafter referred to as the filtering compartment 54. The compartment formed forward of the filter 14 and until the front wall 30, defines a clean water compartment 56. It should be noted that the filter 14 substantially fills the entire height of the tank 10. The upper end of the front wall 30 terminates in a downwardly directed, arcuately shaped forward wall 58 which forms a spillway for water flowing from the clean water compartment 56 back into the aquarium tank. A substantially horizontal ledge 60 is interposed between the spillway 58 and the vertical front wall section 30. Another forward lip portion 62 is formed at the front end of the spillway 58. The height of the spillway 58 is above the height of the wall 40, as can best be seen in FIG. 3.

As shown in FIG. 4, the filter assembly of the present invention is positioned on the side wall 61 of the aquarium tank with the lip portion 62 of the assembly disposed below the normal level 63 of water contained within the tank. This construction provides for good aeration of the water as it spills over the spillway and contacts the surface of the water in the aquarium. The horizontal lip portion 62, however, diverts this incoming water from further downward movement and instead directs it horizontally across the upper portion of the water in the tank. This is advantageous in that both aeration and a wide distribution of the incoming water is effected. This avoids a condition in which the incoming water remains in one location of the tank adjacent the filter assembly and merely recirculates back through the filter assembly.

As shown in FIGS. 1 and 4, the upper end 66 and the lip portion 62 of the spillway are both provided with recessed circular water diverters 62'. These water diverters extend in a row transversally of the direction of flow water over the spillway. The diverters function to disturb the flow so as to cause aeration of the water as it flows back into the aquarium tank.

The water diverters are formed as part of the molding process of the filter assembly. Specifically, they are formed by lengthening the ejector pins used during molding. It was discovered by providing these indentations, the rippling effect and consequent aeration of the water flow occurred. Prior spillway constructions have included similar mold marks at the top and bottom of the spillway, but not in continuations where the bottom lip is located to be below the normal level of water in the aquarium tank. Also, with the prior construction the spillway was a vertical wall such as shown in U.S. Pat. No. 4,285,813.

The cover 16 is arcuately shaped to conform to the arcuate shape at the top of the tank 12. The cover 16 includes an arcuate upper surface 64 with a downwardly depending rear skirt portion 66 and side skirt portions 68, 70. A semicircular protruding bulge 72 is formed proximately the distal end of the arcuate cover surface 64 and on one side thereof, to accommodate the intake tube assembly, which will be hereinafter described.

A ledge 74, arcuately shaped to conform to the shape of the skirt portion 70, is formed along the upper end of the wall 28 of the filter tank 12. A corresponding arcuate ledge 76 is also formed inwardly of the side wall 26. At the rear edge of the ledge 74, there is provided a ramp surface 78 which terminates in the verticle wall 80. A corresponding ramp surface 82 is formed at the rear of the ledge 76 and also terminates in a vertical wall 84. A downwardly directed stop member 86 is provided along the skirt portion 70, and a corresponding stop member 88 is provided at the rear of the skirt portion 68.

Accordingly, the upper cover will snugly fit on top of the tank by having the skirt 70 sit on the ledge 74 with the stop member 86 abutting the vertical wall 80 at the end of the ramp surface 78. Correspondingly, on the other side, skirt 68 will sit within the ledge 76 and the stop member 88 will abut the rear of the ramp section 82. This will hold the cover securely in place and at the same time will retain it substantially flush with the upper edges of the rear wall 34.

Figure 3:
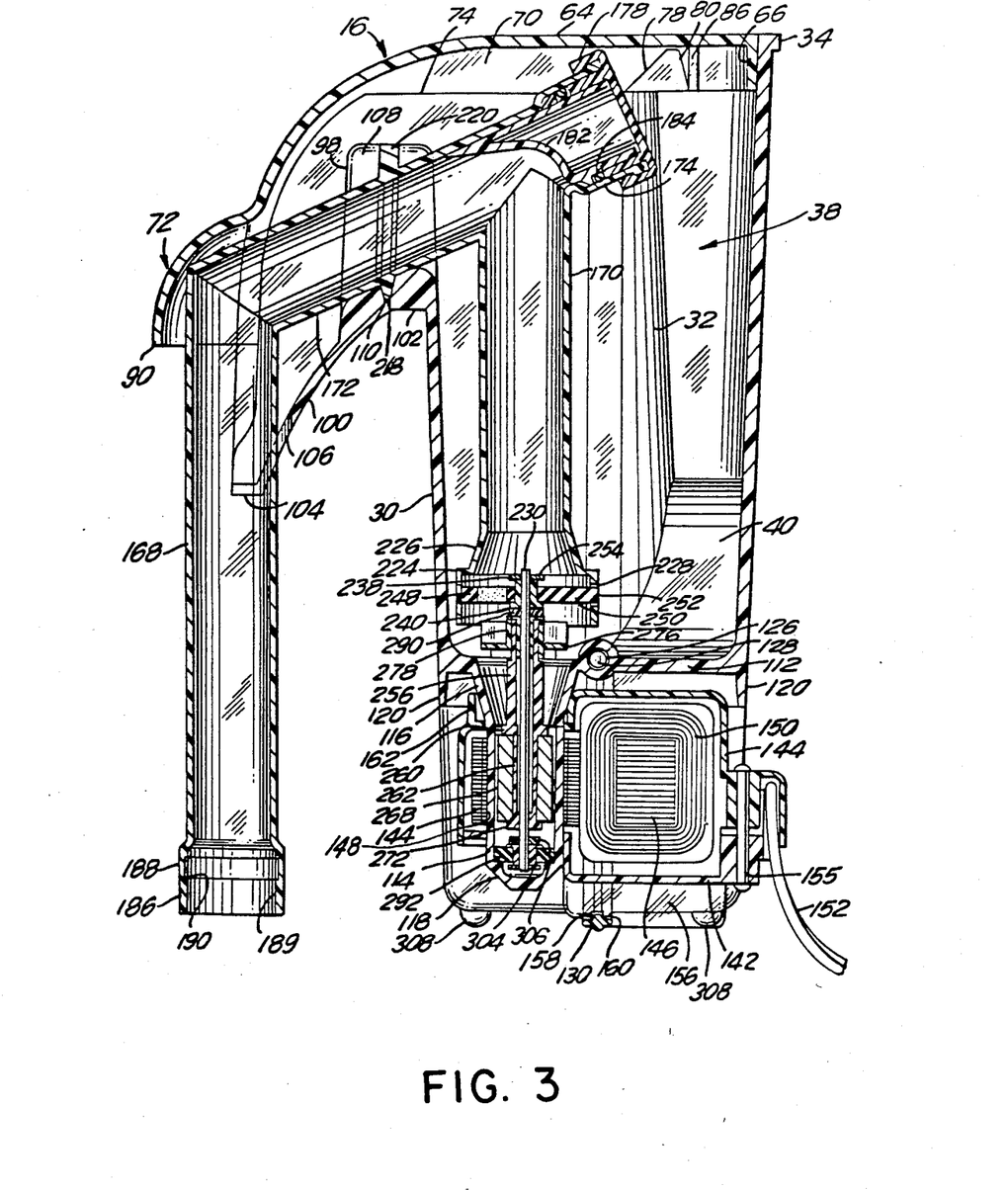
FIG. 3 is a cross sectional elevational view taken along line 3—3 of FIG. 1, and specifically showing the intake assembly operatively associated with the housing unit, and the externally supported motor.

As can best be seen in FIGS. 1 and 3, the lower edge 90 of the cover 16 terminates in a common vertical plane but spaced above the lower lip 62 to define an opening 92 through which the clean water can pass as it flows along the spillway 58 and from there returns to the aquarium.

Figure 5:
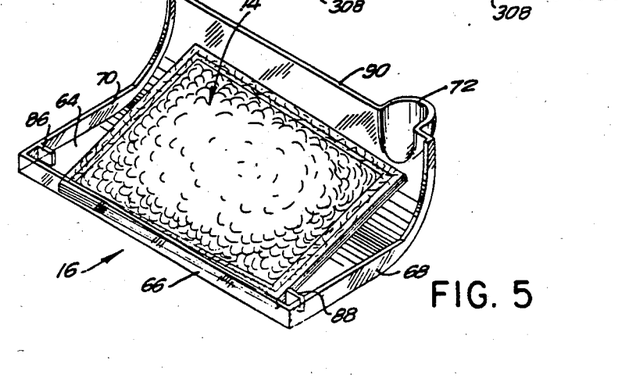
FIG. 5 is a perspective view of the cover inverted, and showing the cover used to transport filter material being discarded.

It is noted that the cover is removable and can act as a tray for removal of clogged filter cartridge. Specifically, in order to clean, the filter material 14 can be slid out of its position in the filter and temporarily placed on the inverted cover. The cover will then serve as a tray holding the used filter material until its disposal at a suitable disposal unit.

A forward facing surface 96 interconnects the front of intermediary walls 31, 32 at the front of the filter. At the front of the intake receiving chamber 36 there is provided a forward wall having a vertical section 98 which continues downwardly into a forward arcuately sloping section 100. The forward section 100 corresponds in curvature to the arcuate shape of the spillway 58. A substantially horizontal ledge 102 interposes the front wall 30 with the arcuate section 100. A forward lip 104 terminates the front end of the arcuate section 100.

A semicircular groove 106 is formed into the lip 104 and the corresponding arcuate section 100 to accommodate the intake tube assembly, as will hereinafter be described. The position of the semicircular groove 106 corresponds to the bulge 72 formed in the cover 16 so that the intake tube assembly is accommodated therebetween.

The upper end of the vertical wall section 98 at the front of the intake receiving chamber 36 has a substantially U-shaped groove 108 formed therein and a channel 110 is formed in that U-shaped groove. The channel 110 will receive a supporting member of the intake tube assembly in order to support it in position, as will hereinafter be described.

At the bottom of the receiving chamber 36 there is formed a base wall 112 from which depends a tube 114 having a funnel shaped upper end 116 and a lower conical tip 118. A downwardly depending peripheral skirt portion 120 is formed about the lower wall 112 of the receiving chamber 36.

Adjacent the side wall 26 of the receiving chamber 36 is provided an upstanding support member 122 having a bifurcated V-shaped receiving notch 124. In the lower wall 112, and spaced from the depending tube 114, there is provided a hollow cylindrical tunnel 126 defining a circular opening 128 passing therethrough. The opening 128 is accessible exteriorly from either side of the base wall 112.

The bail portion 20 comprises a substantially U-shaped member including the legs 130, 132 interconnected by the bight portion 134. At the distral ends of the legs 130, 132 there are provided the enlarged heads 135, 136 from which inwardly extend the pins 138, 140. The pins 138, 140 are sized to fit within the opening 128 to permit the bail 20 to depend beneath the intake receiving chamber 36.

The motor housing 18 comprises a plastic housing member 142 with a corresponding cover 144. Within the housing 142 there is contained a motor of a standard type, and including a plurality of stator laminations 146 defining a bore 148 therethrough and accommodating a winding 150 from which extends the wire 152 for energizing the winding. The cover 144 has an opening coaxial with the bore 148 formed in the stator laminations 146. The cover 144 can be held in place by means of fasteners such as a rivet, screw etc. inserted in the openings 154 which can also serve to hold the stack of laminations secured in place. In addition rivet 155 can hold the housing sections in place.

A rudder 156 extends vertically downward from the motor housing 142 and incudes a notch 158 therein which can accommodate the bight portion 134 of the bail 20. A rib 160 is formed internally and externally of the bale 20 to accurately be positioned in the notch 158 in the rudder 156.

It should be appreciated that the motor housing 18 can be positioned beneath the intake receiving chamber 36 by inserting the depending tube 114 into the aperture provided in the motor housing and extending the tube 114 into the bore 148 in the stator laminations. The motor housing 142 can then be held in place by passing the bail 20 around the outside of the motor housing so that the rib 160 of the bight portion 134 is received within the notch 158 of the rudder 156. This will retain the motor housing removably secured beneath the bottom wall 112.

The motor housing 142 can be protected by means of the skirt 120 which surrounds the upper portion of the motor housing. Also, an upwardly extending peripheral wall 162 can be provided about the upper portion of the motor housing 142 which will closely abut the funnel 116 of the depending tube 114.

The removable intake assembly is shown formed as a unitary assembly, as shown in FIG. 6. The intake assembly shown generally at 22 comprises a substantially U-shaped intake flow tube 166 including a first vertical leg 168 and a second vertical leg 170 interconnected by a connecting leg 172. The three legs are in fluid flow communication. The connecting leg 172 is downwardly angled and the leg 168 terminates at its lower end at a level lower than the termination of the leg 170.

The upper distal end 174 of the leg 172 extends beyond its interconnection to the leg 170. A plug 176 including a cap 178 is used to rotate a valve plug 180 into the end 174 of the connecting leg 172. The valve plug 180 has an arcuately shaped termination 182 which can be rotably positioned at the junction between the vertical leg 170 and the connecting leg 172 in order to serve to control the opening at the junction to thereby limit the flow of water through the U-shaped intake tube 166. O-ring 184 can be positioned about the cap 178 to provide a tight fit into the opening.

Figures 8, 9:
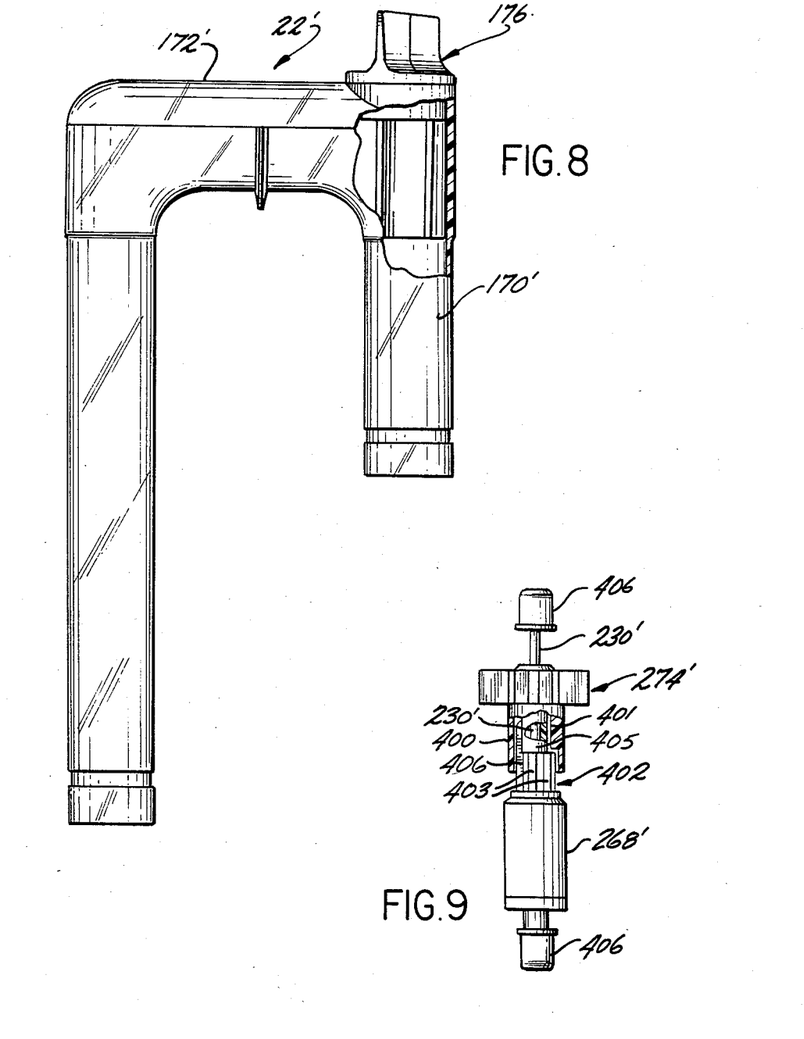
FIG. 8 is a side view of a modified embodiment of the intake tube and flow control valve unit.
FIG. 9 is a view of the impeller and magnet rotor unit, partially broken away to show the clutch mechanism.

In a modified construction of the control valve shown in FIG. 8, the valve is mounted in the connecting leg 172' of the intake tube 22' and in axial alignment with the vertical leg 170'. As with the embodiment shown in FIGS. 2 and 6, the control valve has an open end disposed within the intake tube, and a closed end disposed exteriorly of the tube for manual manipulation. Also, the control valve is rotatably mounted in the intake tube and the open end has one diametric side which extends axially further than the other side. Specifically, in the embodiment shown in FIG. 8, the tubular open end of the control valve has one diametric side removed so that when the control valve is in the open position shown in FIG. 8, it will permit flow of water through the connecting leg 172' and into the vertical leg 170'. To move the control valve to a flow blocking position, it is rotated by turning the exposed closed end. In this position, the structure of the open end of the tube will partially block the opening at the junction of the connecting leg 172' and the vertical leg 170'. It is to be noted, however, that in this blocking position, the control valve will not fully block the flow of water through the intake tube. Therefore, the pump will not become overloaded.

The control valve is useful in regulating the rate of flow of water through the filtering system. An example where one might desire to have a lower rate of flow would be when food is being added to the aquarium. By lowering the rate of flow, the disturbance to the water and the food in the aquarium by the incoming water from the filtering system is reduced, and the filter is therefore not overloaded with fish food.

The lower end of the leg 168 terminates in a wider neck portion 186. As shown in FIG. 3, the upper part of the neck portion 186 has a thinner wall section 188 than its lower portion 189 to thereby define a shoulder 190 therebetween.

As best shown in FIG. 2, an extension tube 192 can be inserted into the neck 186. The extension tube 192 includes a cylindrical body portion 194 with upwardly extending arms 196, 198. Each of the arms includes outwardly directed fingers 200. The arms 196, 198 can be inserted into the neck portion 186 with the fingers 200 catching onto the shoulder 190 in order to retain the extension tube 192 in place. The lower end of the arms 196, 198 include an outwardly directed flange 202 which serves as a stop for the neck portion 186. At the lower end of the extension tube 192 there is provided a terminating end 204.

Alternately, a strainer 206 can be inserted into the neck 186. Again arms 208, 210 are provided with outwardly directed fingers 212 on the arms 208, 210 in order to permit catching onto the shoulder 190 in the neck portion 186 The strainer 206 has a hollow cylindrical body member 214 with a plurality of spaced apart openings 216 which can serve to filter the contaminated water entering into the intake tube 166.

About the periphery of the inter-connecting leg 172, there is provided a U-shaped flange 218 with a substantially flattened top edge 220. The periphery of the flange 218 terminates in a knife edge. At the lower end of the leg 170, there is provided an outwardly flared section 222 which terminates in a collar 224. A laterally extending positioning tab 226 extends from the collar. Also, a plurality of openings 228 are formed about the periphery of the collar for receiving the rotor assembly, to be hereinafter described.

The rotor assembly, as best seen in FIG. 2, includes a shaft 230 having upper and lower axially extending tips 232, 234. A mounting plug 236 is firmly mounted onto an upper end of the shaft 230. The mounting plug 236 includes a square shaped body 238 having an aperture 239 with a circular peripheral flange 240. Firmly positioned on the plug 236 is a mounting ring 242. The mounting ring 242 includes a circular hub 244 having a square shaped central opening 246 which sits on the square shape plug 238. An outer circular ring 248 is retained by the hub 244 by means of the spokes 250. In this way, fluid can pass between the hub 244 and the peripheral ring 248. Outwardly extending tabs 252 extend from the mounting ring 248 and are retained within the openings 228 on the collar 224. The mounting ring 242 is held in place on the shaft 230 by means of the push on retaining washer 254.

In this manner, the mounting ring 242 is securely fixed onto the shaft 230 and is supported by the collar 222 of the intake tube 166. Furthermore, because it is securely held on the shaft 230, the mounting ring 242 also holds the shaft 230 in fixed position.

A magnet holder 256 is positioned centrally along the shaft 230. The magnet holder 256 is formed of non-conductive material, such as plastic. It forms a sleeve which can rotate about the shaft 230. The magnet holder 256 comprises a substantially cylindrical body portion 258 terminating in a peripheral flange 260. At the bottom of the flange 260 there is provided a substantially square shaped leg portion 262. At the upper end of the body portion 258, there is provided a reduced diameter cylindrical neck portion 264 including an outwardly directed finger 266 which forms part of a clutch mechanism for engaging an impeller, to be hereinafter described.

A magnet 268, typically of ferrite material, is substantially cylindrical in shape and includes a square opening therethrough 270 which corresponds in shape to the square leg portion 262 of the magnet holder 256. The magnet 268 can be molded onto or positioned onto the square shaped leg portion 262 so as to be firmly supported thereby. The circular flange 272 at the lower end of the leg portion 262 serves to hold the magnet 268 in place.

Positioned above the magnet holder 256 is provided an impeller 274. The impeller 274 comprises a circular base 276 with an upstanding central circular hub 278. Laterally extending fins 280 extend from the hub 278 and are positioned on the base 276.

A shaft bearing 282 is pressed downwardly into a central opening within the hub 278. The shaft bearing 282 includes a cylindrical body portion 284 with an upper flange 286 which sits above the hub 278.

As can best be seen in FIGS. 3 and 7, the shaft bearing 282 fits internally of the neck portion 264 of the magnet holder 256 as well as the impeller hub 278. The impeller hub fits about the neck portion 264. Downwardly depending from the lower surface of the base 276 of the impeller 274, is a tab 288 which is positioned to engage the outwardly extending finger 266 extending from the neck 264.

As is best seen in FIG. 6, the tab and finger sections 288, 266 are positioned so as to matingly engage. As the magnet holder 256 is caused to rotate, it will initially begin rotating without the impeller moving. After at least a portion of a singe rotation, the finger 266 will engage the tab 288 on the impeller to thereby cause the impeller to rotate along with the magnet holder 256.

Accordingly, a clutch mechanism is provided between the impeller 274 and the magnet holder 256. The holder 256 will therefore be permitted to initiate rotation without the extra load of the impeller. In this manner, less initial force is required in order to overcome the inertia of the magnet holder 256 since the impeller is not impeding its rotation. Only after initial inertia is overcome, and the magnet holder 256 begins rotating, the clutch mechanism is engaged whereby the impeller is driven by the rotation of the magnet holder 256.

FIG. 9 shows a modified embodiment of the impeller and magnet rotor unit which is attached to the bottom of the vertical leg 170 or 170' of either of the intake tubes shown in FIGS. 2 and 8. In this embodiment, the clutch mechanism is constructed to be fully supported against jamming as might be caused by canting of the clutch on its support.

As with the impeller and magnet rotor unit shown in FIGS. 2 and 6, the modified embodiment of FIG. 9 includes a shaft 230' for mounting the parts of the unit. A magnet rotor 268' is rotatably mounted on the lower end of the shaft for cooperating with the stator part of the motor 146. An impeller 274' is rotatably mounted on the shaft above the magnet rotor. The impeller is drivingly connected to the magnet rotor by means of a clutch. The clutch of the embodiment shown in FIG. 9 includes a sleeve 400 which is fixed to the impeller and extends downwardly therefrom in concentric relation to the shaft 230'. The sleeve has an internal diameter larger than the diameter of the shaft so as to be spaced radially therefrom. On the internal surface of the sleeve is an axially extending sleeve rib 401. This rib extends along the sleeve from its upper end and terminates at a location space from the lower end of the sleeve.

A bearing support 402 is mounted on the shaft 230' in fixed relation to the magnet rotor 268'. As shown in FIG. 9, the bearing support extends axially upwardly of the magnet rotor and includes an axially ribbed outer surface defined by a plurality of axially extending ribs 403. The bearing support extends upwardly into the bottom end of the sleeve 400 and the outer ribbed surface has a diameter complementary to the internal diameter of the sleeve so as to provide a bearing engagement for the lower end of the sleeve.

The bearing support further includes a central core 405 which extends axially upwardly from the ribbed surface. This core has a diameter less than the internal diameter of the sleeve. A clutch rib 406 extends axially on the central core of the bearing support and into lateral rotative alignment with the sleeve rib for drivingly engaging with the sleeve rib after a portion of a single revolution of the magnet rotor. As shown in FIG. 9, the clutch rib is defined by an axial extension of one of the ribs making up the ribbed surface of the bearing support. Also, the clutch rib extends radially outwardly of the central core so as to provide a bearing engagement with the internal surface of the sleeve. Similarly, the sleeve rib 401 extends radially inwardly from the inner surface of the sleeve into bearing engaging relation with the central core of the bearing support. With this construction, the sleeve is concentrically held on the shaft 230 by bearing engagement with portions of the bearing support along its entire length. Thus, the sleeve and related clutch parts cannot become skewed on the support shaft 230'. Also, the clutch and sleeve ribs are disposed internally of the sleeve and thus protected against damage.

Finally, the impeller and magnet rotor unit includes two bushing and containment members 406. These members are connected at opposite ends of the shaft to contain the parts of the unit on the shaft but to permit some axial play as is included with the embodiment shown in FIGS. 2 and 3. The upper member further provides a means for connecting the unit to the lower end of the intake tube, while both members provide support for the unit with the rotor in cooperating relation with the stator of the motor 146 in generally the same way as shown with the embodiment of FIG. 3.

Above the shaft bearing 282, there is provided a floating washer 290. The lower end of the shaft passes through a flexible bushing 292, such as is formed of a suitable elastomer. The center of the bushing 292 has a square cutout 294 which receives a mounting plug 296. The mounting plug 296 includes a substantially square body portion 298 with an upper circular flange 300. The opening 302 in the plug 296 tightly fits onto the shaft 230 and the bushing 292 fits onto the square body portion 298 of the plug. A push-on retaining washer 304 secures the bushing 292 in place at the lower end of the shaft. A floating washer 306 fits between the lower bushing 292 and the magnet holder 256.

With the rotor assembled, it is inserted with the elastomer mounting ring 242 positioned within the collar portion 224 at the lower end of the intake tube 166. The rotor assembly will therefore axially depend from the leg 170

The unitary intake assembly 22, as shown in FIG. 6, can be positioned into the intake receiving chamber 36. The U-shaped flange 218 sits within the seat portion 110 in the front wall 98 of the intake receiving chamber 36 which serves to hold the unitary intake assembly in place. The tab 226 laterally extending from collar 224 fits within the bifurcated V-shaped notch 124 provided at the side of the receiving chamber 36 and accurately positions the unitary intake assembly in place.

With the unitary intake assembly 22 suitably positioned, the rotor assembly will fit snugly into the depending tube 114. As can best be seen in FIG. 3, the lower bushing 292 will then snugly fit into the bottom of the depending tube 114 and will hold the shaft 230 in place. The shaft 230 will thereby be fixedly secured between the lower bushing 292 and the upper mounting ring 242. However, the magnet holder 256 is free to rotate about the shaft 230.

It should be appreciated, that in addition to providing free rotational movement of the magnet holder 256 about the shaft 230, there is also provided axial play in the movement of the magnet holder 256. Specifically, there is movement of the holder axially along the shaft between the two floating washers 290 and 306. These washers, in turn are limited in their axial movement by means of the upper fixed mounting plug 236 and the lower mounting plug 296. With the rotor assembly positioned within the depending tube 170 as is best seen in FIG. 3, when the stator laminations 146 are energized by means of the coil 150, they will create a magnetic flux. With the magnet 268 mounted on the magnet holder 256 and permitted to axially float, the magnet will suitably orient itself in order to maximally cut the flux lines. Furthermore, it will thereby cause the magnet holder 56 to rotate by means of the magnetic coupling between the magnet 268 and the stator laminations.

Rotation of the magnet causes the magnet holder 256 to rotate, which in turn causes the impeller 274 to rotate.

It should be appreciated that the motor housing 18 does not include any rotating parts. Only the stator fixed laminations are provided and a coil. All the rotating parts are provided directly within the intake receiving chamber and the impeller as well as the rotor are both provided within the intake storage chamber.

The operation of the filter is as follows. The intake assembly, as shown in FIG. 6, is assembled with the rotor assembly axially extending from the lower end of the intake tube. The entire assembly as shown in FIG. 6 is then inserted into the filter and accurately positioned by means of the U-shaped notch 110 and the bifuricated notch 124.

With the intake assembly accurately positioned, the rotor assembly will be situated within the depending tube 114. This in turn will fit within the bore 148 of the stator laminations of the motor housing 18 held beneath the intake receiving chamber by means of the bail 20.

The filter is then positioned over the upper edge of an aquarium with the ledge 60 of the spillway 58, as well as the ledge portion 102 of the intake support, serving to retain the filter in place at the upper edge of the aquarium tank.

With the filter properly positioned, the intake downwardly extending leg 168 should reach into the aquarium water. If necessary, the extension tube 192 can be connected in order to reach the aquarium water. The coil of the motor is then energized by connecting it to a source of energy. This will then energize the stator and cause the rotor to turn about the shaft. This in turn will cause the impeller 274 to begin pumping. It should be noted, that when assembled, the impeller is positioned just beneath the outlet mouth of the intake tube. As a result, the contaminated water which is drawn up through the vertical leg 168 and passes through the connecting leg 172 downwardly flows through the depending leg 170 and is pumped into the receiving chamber by means of the impeller.

As the water accumulates in the receiving chamber 36, it reaches a level sufficient to flow over the wall 40 and thereby passes into the filtering compartment 54 of the filtering chamber 38. Continuous pumping of the water into this chamber forces the water through the filter 14. The water will therefore pass into the clean water compartment 56. When the water reaches the edge of the spillway, it will pass over the spillway wall and flow back into the aquarium.

Since the entire intake assembly is formed of a unitary construction, when it is desired to clean or disconnect the filter, it is only necessary to lift off the cover 16 and immediately pull up the unitary intake assembly. The entire intake assembly can thereby be removed, including both the intake tube as well as the rotor assembly, which is then pulled out of the depending tube 114. This will permit cleaning the impeller, as well as cleaning of the rotor and other moving parts. It will also permit cleaning of the intake tube from all material that may have collected therein.

It should further be appreciated, that the rotor assembly itself, can also be separated from the intake tube simply by pressing on the mounting ring 242. This will remove the tabs 252 from the slots 228 in the collar 224 and the entire rotor assembly can then be separated for further cleaning.

The housing itself is provided with a peripheral stiffening member 307 and also with short legs 308 on which the housing can stand. This permits storage of the filter by itself when it is not in use.

There has been described heretofore the best embodiments of the invention presently contemplated. However, it is to be understood that various changes and modifications may be made thereto without departing from the spirit of the invention.

I claim:

1. The improvement in an aquarium filter assembly having a housing unit adapted to be mounted on a wall of an aquarium tank and having an inlet chamber for receiving contaminated water from the aquarium tank, a filter chamber for filtering the contaminated water, said chambers being in fluid flow communication with each other, an intake tube having an inlet end positioned in the aquarium tank and a discharge end positioned in the inlet chamber for supplying the contaminated water from the aquarium tank to the inlet chamber, means for introducing the filtered water back into the aquarium tank, and pump means for pumping contaminated water through said intake tube from the aquarium tank to the inlet chamber, the improvement wherein the intake tube comprises:

(a) a first vertical leg defining said inlet end at the lower end thereof;

(b) a second vertical leg spaced from the first vertical leg and defining said discharge end at the lower end thereof;

(c) a connecting leg extending between and connecting the upper ends of said first and second vertical legs in fluid communication with each other, said connecting leg being positioned above the level of water in the aquarium tank and inlet chamber when said inlet end is positioned in said aquarium and the discharge end in the inlet chamber; and (d) adjustable valve means disposed in said connecting leg for controlling the rate of flow of water therethrough, and including a manually operable portion disposed externally of said connecting leg.

2. The improvement in an aquarium filter assembly having a housing unit adapted to be mounted on a wall of an aquarium tank and having an inlet chamber for receiving contaminated water from the aquarium tank, a filter chamber for filtering the contaminated water, said chambers being in fluid flow communication with each other, an intake tube having an inlet end positioned in the aquarium tank and a discharge end positioned in the inlet chamber for supplying the contaminated water from the aquarium tank to the inlet chamber, means for introducing the filtered water back into the aquarium tank, and pump means for pumping contaminated water through said intake tube from the aquarium tank to the inlet chamber, the improvement wherein the intake tube comprises:

(a) a first vertical leg defining said inlet end at the lower end thereof;

(b) a second vertical leg spaced from the first vertical leg and defining said discharge end at the lower end thereof;

(c) a connecting leg extending between and connecting the upper ends of said first and second vertical legs in fluid communication with each other, said connecting leg being positioned above the level of water in the aquarium tank and inlet chamber when said inlet end is positioned in said aquarium and the discharge end in the inlet chamber;

(d) adjustable valve means disposed in said connecting leg for controlling the rate of flow of water therethrough;

(e) the adjustable valve means is tubular in shape with an open end disposed internally of said connecting leg and a closed end disposed externally of said connecting leg for manual manipulation;

(f) said open end extends axially further on one diametric side thereof than on the other; and (g) said control valve is rotatably mounted in said connecting leg from a first position where said one diametric side is in non-blocking relation to the flow of water through the tube and a second position in at least partial blocking relation to said flow.

3. The improvement according to claim 2 wherein:
(a) the control valve is located at the junction of said connecting leg and one of said vertical legs to control the opening at the junction when rotated between said first and second positions.

4. The improvement according to claim 3 wherein:
(a) the one diametric side of said control valve extends transverse to the flow of water through one of said legs at said junction.

5. The improvement according to claim 4 wherein:
(a) the open end of said control valve is sized to remain partially spaced from the inner wall surface of the legs of said intake tube to permit some flow of water therethrough when in said second blocking position.

6. The improvement in an aquarium filter assembly for use with an aquarium tank filled with water to a normal level, the assembly having a housing unit adapted to be mounted on a wall of an aquarium tank and a spillway bridging between the housing unit and aquarium tank for directing water from the housing unit into the aquarium tank, the improvement wherein the spillway comprises:
(a) a generally vertically disposed arcuately shaped forward wall having its upper end in said housing unit and a vertical height sufficient for its lower end to extend into said aquarium tank and below the normal level of water in said tank; and
(b) a horizontally oriented lip portion at the lower end of the spillway for positioning below the normal level of water in the aquarium tank for directing said water from said housing unit horizontally across the upper portion of the water in the tank.

7. The improvement according to claim 6 wherein:
(a) said spillway has a predetermined vertical height so that its lower end is located between about 1/16 of an inch and one inch below the normal level of water in the aquarium tank.

8. The improvement according to claim 7 further comprising:
(a) recessed water diverters located across the upper end of the spillway for disturbing water flow over said upper end.

9. The improvement in an aquarium filter assembly having a housing unit adapted to be mounted on a wall of an aquarium tank and having an inlet chamber for receiving contaminated water from the aquarium tank, a filter chamber for filtering the contaminated water, said chambers being in fluid flow communication with each other, an intake tube having an inlet end positioned in the aquarium tank and a discharge end positioned in the inlet chamber for supplying the contaminated water from the aquarium tank to the inlet chamber, spillway means for introducing the filtered water back into the aquarium tank, and pump means for pumping contaminated water through said intake tube from the aquarium tank to the inlet chamber, the improvement comprising:
(a) a separator wall disposed between said inlet chamber and filter chamber for physically separating said chambers, at least part of said wall extending to a height less than the height of said spillway means of the housing unit, to separate a level of water in said inlet chamber sufficient to prime said pump means.

10. The improvement according to claim 9 wherein said separator wall has:
(a) a first forward section adjacent the spillway means which has its upper end disposed above said spillway means; and
(b) a second rearward section which has its upper end disposed below said spillway means and at a short height from the bottom of the inlet chamber whereby the pump means can be primed with a small amount of water placed in said inlet chamber.

* * * * *